United States Patent [19]

Solbakken et al.

[11] 4,250,158

[45] Feb. 10, 1981

[54] PROCESS FOR RECOVERING CARBON BLACK AND HYDROCARBONS FROM USED TIRES

[75] Inventors: Åge Solbakken, Montgomery; Fred P. Apffel, Houston; Sam P. Robinson, Houston; Bobby L. Hayes, Houston, all of Tex.

[73] Assignee: Intenco, Inc., Houston, Tex.

[21] Appl. No.: 878,088

[22] Filed: Feb. 15, 1978

[51] Int. Cl.$^3$ .......................... C01B 31/02; C09C 1/48
[52] U.S. Cl. ..................................... 423/449; 201/2.5; 585/241
[58] Field of Search ............... 423/445, 448, 449, 450, 423/453, 460, 461; 422/150; 201/2.5, 21, 25, 28; 202/118; 260/683 PP; 585/241

[56] References Cited

U.S. PATENT DOCUMENTS

| | | | |
|---|---|---|---|
| 3,772,242 | 11/1973 | Liska et al. | 423/449 |
| 3,823,224 | 7/1974 | Laman et al. | 423/445 |
| 3,966,487 | 6/1976 | Crane et al. | 423/449 |
| 3,978,199 | 8/1976 | Maruhnic et al. | 423/449 |
| 4,038,100 | 7/1977 | Haberman | 423/445 |

*Primary Examiner*—O. R. Vertiz
*Assistant Examiner*—Gregory A. Heller
*Attorney, Agent, or Firm*—David Ostfeld

[57] ABSTRACT

The invention is a process for economically recovering carbon black, tar, oil and fuel gas from used tires. Used tires are physically sliced and fragmented. The fragments are pyrolized in an oxygen-limited, hydrocarbon vapor at subatmospheric pressure while being refluxed with process tar condensate. Vapor phase products of the pyrolysis are fractionated into tar, oil and fuel gas. The fuel gas can be compressed and burnt to provide process heat. Solid phase pyrolysis products are stripped of trash and milled to carbon black in an air swept roller mill. Carbon black is mechanically separated from the effluent air stream of the roller mill and formed into pellets that are dried in a series multi-stage fluid bed dryer.

30 Claims, 2 Drawing Figures

PROCESS FOR RECOVERING CARBON BLACK AND HYDROCARBONS FROM USED TIRES

FIELD OF THE INVENTION

The invention relates generally to processes for economically recovering carbonaceous materials from used vulcanized articles. More specifically it relates to an economical pyrolysis process for recovering carbon black, tar, oil, fuel gas and steel from used tires.

BACKGROUND OF THE PRIOR ART

Passenger cars and trucks on U.S. highways wear out tens of millions of tires each year. Disposal of these used tires has become a major environmental problem. A high proportion (up to 25%-35%) of the weight of a used tire consists of carbon black reinforcing of the rubber in both the tread and sidewalls. This carbon black is prepared by conventional carbon black production processes and comprises individual particles one micron or less in diameter. Fifty to sixty percent (50%-60%) of the weight of a discarded tire is butadiene-styrene copolymer rubber. Tires also contain large amounts of oil and significant quantities of steel wire and/or fiberglass cord. All of these components are expensive and require large amounts of energy in their manufacture. A process that would allow economic recovery of these materials from the huge stocks of used tires piling up around the country would be very desirable. Unfortunately, the very characteristics that make tires long-lasting and safe on the road, i.e., durability, resistance to puncture and slicing, and resistance to decomposition at moderate temperatures; combine to make tires exceptionally difficult to recycle.

The prior art teaches that rubber can be pyrolyized in the absence of air at temperatures of between 842° and 1112° Fahrenheit in laboratory equipment to produce oil, gas and a solid residue that is carbonaceous in nature. Large electrically heated sink reactors and Dewar flasks have been used for obtaining test data.

The prior art also teaches some pilot plants that were built to carry tire processing schemes into the commercial world. Circulating heated ceramic balls have been used as a direct source of reaction heat. The balls are heated externally, mixed with rubber feed chips, discharged, screened, reheated and recycled. These reactions take place substantially at atmospheric pressure. Other pilot plants have been designed which make the carbonaceous solid phase of tire pyrolysis into fuel briquets. These fuel briquets are much less valuable than the carbon black produced by the present invention. Still other batch pilot plants have been built in which the tires are indirectly heated through the tray walls of multi-tray reactors to temperatures of between 1400° and 1600° Fahrenheit. At these temperatures, heavy oils and tar products can be recycled for further cracking to improve carbon black yields. Other batch type process plants have been built that depend on indirect heating through the walls of a jacketed screw reactor from a high temperature molten salt heat sink. These reactors do not have hollow shafts nor hollow flights and have far less heat transfer area than the present invention.

It is extremely difficult to physically break tires apart to obtain individual rubber particles free of reinforcing materials. This is particularly true when, as in the prior art, indirectly heated reactors must transfer heat from a heat source to solid tire particles through a wall. Commercially available tire disintegrators include slicing machines, hammer mills, debeaders and manglers that have been adopted to tire reduction from other industries.

The recent introduction of steel reinforcing in both passenger and truck tires has greatly increased the difficulty and expense of sufficiently disintegrating a tire to convert it into a useable pyrolysis feed stock.

Aside from the purely physical problems associated with breaking down used tires before they can be pyrolized, the prior art also teaches that vapors produced from tire pyrolysis are loaded with dusty unburned rubber and carbon black particles. These particles plug up vapor lines, coolers, condensors, and generally gum up equipment. Further, much of the heavier hydrocarbons driven off during pyrolysis is composed of tar and pitch. These high melting point fractions solidify quickly, especially in the presence of dust and again generally gum up downstream processing equipment. If the tires are wet, as happens when they are washed with water to remove accumulated dust and mud, the water vapor distills and forms emulsions with the heavy oils and tars. Tire pyrolysis oils are also contaminated with metals and solids carryover. This causes them to have greatly reduced value as fuel oils. The high degree of metallic impurities also causes significant problems to be associated with the use of these hydrocarbons for fuel.

The present invention overcomes the physical difficulties of the prior art in preparing used tires as a feedstock by first slicing the tires and then disrupting them to free reinforcing materials. The problems of the prior art with tar and heavy hydrocarbons are avoided by taking out a separate tar or high boiling point condensate side stream. Heat transfer efficiency of the present invention is greatly increased by refluxing a portion of this tar or high boiling point condensate through the vapor scrubber into the solid phase of the pyrolysis reaction.

Solid phase pyrolysis reaction products taught by the prior art include partially decomposed rubber, carbon black particles, fiberglass, steel wire, metallic oxide ashes and dust. The prior art has never taught any satisfactory way of converting this conglomerate carbonaceous mixture into a clean fuel. It is even more difficult to convert such a mixture of components into saleable quantities of carbon black, which would yield much greater economic returns. Because of these difficulties and the environmental restraints placed on such recovery processes, the prior art does not teach a pyrolysis system for the conversion of vehicle tires to saleable carbon black and hydrocarbons.

It is an object of the present invention to teach a method of and teach apparatus for pyrolyzing used tires economically into commercial quantities of tar, oil and fuel gas.

It is a further object of this invention to teach a method of recovering steel scrap from used tires.

It is yet another object of the present invention to teach a method of pyrolyzing used tires that is energy efficient and generates all the fuel gas necessary to operate the process within environmental regulations from the process itself.

It is yet another object of the present invention to teach a method of and teach apparatus for pyrolyzing used tires economically into commercial quality and quantities of carbon black.

BRIEF DESCRIPTION OF THE INVENTION

The invention is a process for economically pyrolizing used tires into commercial quantities of carbon black, tar or high boiling point condensate, oil and fuel gas.

In the preferred embodiment, used tires are physically sliced into small pieces in a relatively low energy two-stage parallel knife and anvil slicer. The tire slices are then disintegrated in a relatively energy intensive cracker mill to separate reinforcing materials, such as steel wire and fiberglass, from the rubber of the tire body and to provide small fragments that are approximately one-half inch across for pyrolysis.

These half-inch fragments are magnetically separated from loosened steel wire and introduced by a screw conveyor through a rotary air lock into a pyrolysis reaction vessel. The reactor is a vessel having an internal rotating hollow shaft with appendages, the reactor being indirectly heated through the shaft and its appendages by molten salt or other suitable mixtures introduced into the rotating equipment through rotating seals at a temperature above 750° Fahrenheit.

The fragments are pyrolyzed at approximately 850° Fahrenheit for 5 to 10 minutes under an oxygen limited, hydrocarbon vapor atmosphere at about 6 to 12 PSIA. Exposure to this temperature and pressure causes the tire fragments to separate into a carbonaceous solid phase and a hydrocarbon vapor phase. Both phases are contaminated with dust and metallic impurities.

The vapor phase rises through a tar scrubber, which removes dust, into a condenser. High boiling point liquids are condensed out by indirect heat exchange with water or air or other suitable media, and a portion of the condensate is refluxed back through the tar scrubber into the solid carbonaceous phase in the reactor, creating a liquid phase.

The presence of this liquid condensate in the carbonous reaction product greatly increases heat transfer into the solid phase and allows the reaction to proceed at a higher rate of speed.

Excess liquid not needed as reflux condensate in the reactor is drawn off and cooled by indirect heat exchange with water as a separate liquid side product stream. This removes the high boiling point liquids from the vapor phase and prevents them from solidifying and blocking downstream condensers and separators. The remainder of the vapor phase is cooled to condense oil, which is subsequently separated from residual gas byproducts. These gas by-products can be compressed and burned to provide process heat.

The partially pyrolized carbonaceous solid phase is cooled by indirect heat exchange with water or air or other suitable media. The remaining wire is then magnetically separated from the partially pyrolyzed solid phase. The solid phase is then screened. Trash is separated and discarded and unpyrolyzed materials recycled to the reaction vessel. The remaining pyrolyzed solid phase is milled to carbon black in an air swept roller mill.

The effluent air stream from the rolling mill is passed through a mechanical separator to remove heavy particles. The carbon black is then separated out by a cyclone separator in series with a bag filter.

The carbon black is wetted, formed into pellets and dried in a novel two-stage series fluid bed dryer.

DESCRIPTION OF THE PREFERRED EMBODIMENT

Figure 1A:
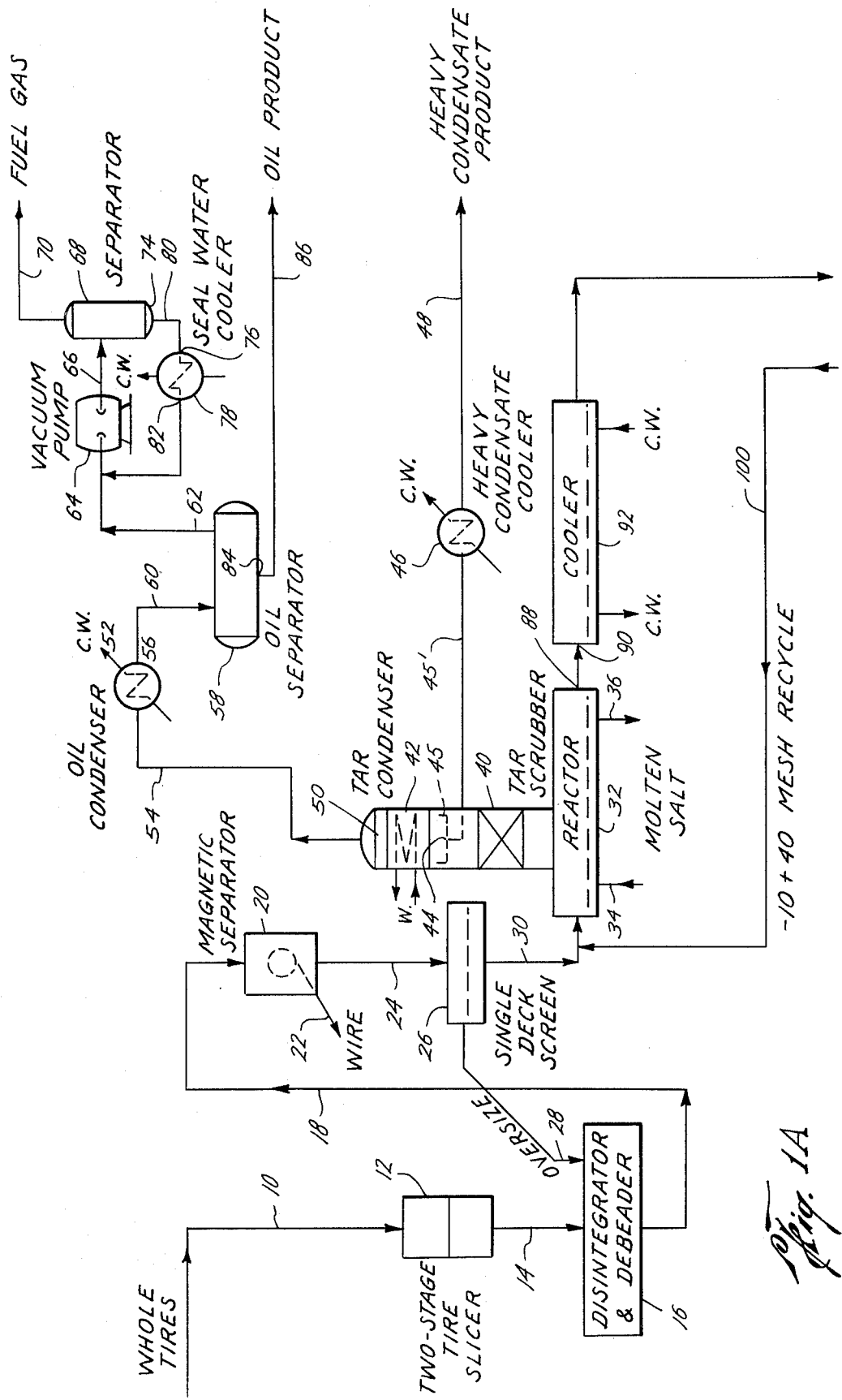
FIGS. 1A and 1B are flow diagrams of a preferred embodiment of the present invention.
Figure 1B:
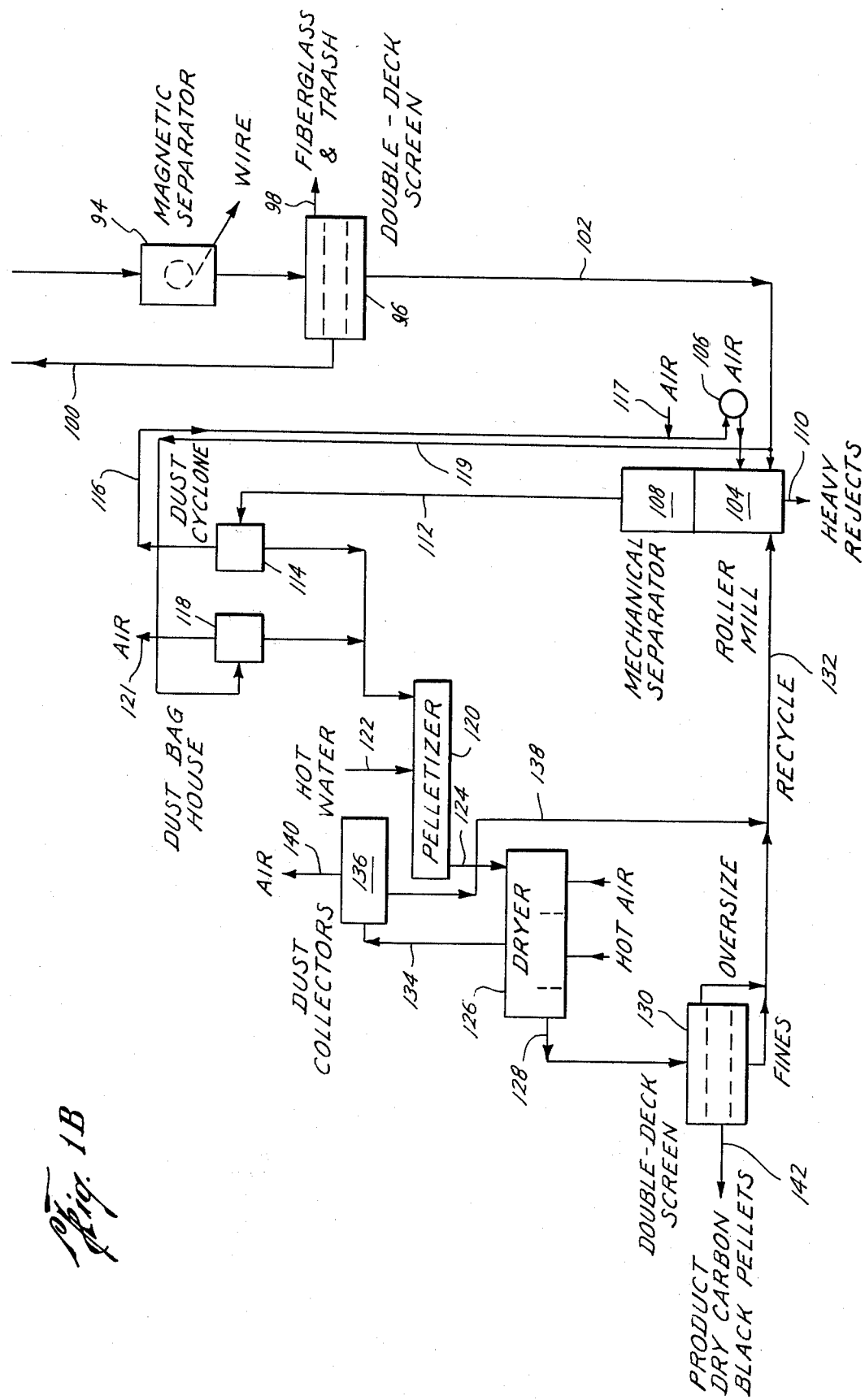

The process shown schematically in FIGS. 1A and 1B comprises:
1. The feed preparation section;
2. A reactor/condenser section;
3. A vapor recovery system;
4. A solid cleaning section;
5. A char milling and recovery section;
6. A pelletizing and pellet drying section.

These sections will now be discussed in detail.

I. Feed Preparation Section.

Whole tires entering at 10 are fed into a two-stage tire slicer 12. The first stage slashes the tires into strips approximately six inches wide with some slightly longer strips. The pre-sliced strips fall by gravity into the second stage of the tire slicer where knife settings are closer together. This second stage produces smaller slices, approximately 2 inches by 6 inches average size. In the preferred embodiment of the present invention, this two-stage tire slicer uses a parallel knife and anvil arrangement to completely slice whole tires into small strips because such an arrangement consumes a minimum amount of energy. This first stage of feed preparation does not separate rubber from carcass reinforcing material, but rather slices the whole tire into segments.

The 2 inch by 6 inch sliced segments move along path 14 to disintegrator and debeader 16. Disintegrator and debeader 16 is a conventional "cracker mill". A cracker mill is a more power intensive disintegrating machine for debeading and further reducing the size of the rubber raw material. Disintegrator 16 breaks down the skeletal carcass of the tire slices, separates rubber from reinforcing steel wire and fabrics and grinds the debeaded tire slices into smaller fragments. Disintegrator 16 reduces the average size of the rubber fragments to less than $1\frac{1}{2}$ inch dimensions, preferably fragments under $\frac{1}{2}$ inch in major dimension. The disintegrated output fragments from disintegrator 16 are carried along path 18 into the input of magnetic separator 20.

The present invention is the first known instance of a commercial system utilizing a preliminary low-energy slicing step to effectively pre-reduce feed size in combination with a more energy intensive second disintegrating step to debead and disintegrate the sliced tires into fragments. The two-step slicing provided by tire slicer 12 of the present invention increases the capacity of the more expensive and energy intensive cracker mill 16. This reduces overall power consumption and slices reinforcing steel wire in the tire carcass into manageable lengths, for example under 4 inches, in the first low-energy stage before they are separated from the tire carcass in the second high-energy stage.

The magnetic separator 20 removes the short lengths of debeaded wire from the system along with small amounts of unstripped rubber which exit the process through output stream 22. Not all of the wire has been freed from the tire corpus after this two-stage physical reduction, but the wire left in the fragments is now in small lengths, for example $\frac{1}{2}$ inch. Reinforcing fabric in the tire carcass other than steel wire remains in the small fragments. The tire fragments proceed along path 24 onto a single screen separator 26.

Separator 26 allows tire fragments less than for example ½ inch in major dimension to pass through a mesh screen but will not pass larger chips. These larger chips are returned via oversize flow path 28 to the input of cracker mill 16. In disintegrator 16, they will again be reduced in size and returned to the magnetic separator 20 and to screen 26 for re-screening. The ½ inch and under fragments proceed via path 30 into the input end of pyrolysis reaction vessel 32.

It will be recognized by those skilled in the art that there are also other methods for reducing tires to a size and composition suitable for introduction into the reactor/condenser section of the preferred embodiment, although they are not as energy effective or produce the size feed of the present invention.

II. Reactor/Condenser Section.

In the preferred embodiment of the present invention, pyrolysis reaction vessel 32 is a hollow shaft, hollow flight unit having screw conveyor with a reduced flight pitch. An alternate embodiment could use a hollow shaft, hollow flight screw with square pitched flights to improve backmixing and overall heat transfer. Other alternate embodiments would use one or more vessels, each having an integral rotating hollow shaft and appendages, the reactor being indirectly heated through the shaft and its appendages by either hot oil or molten salt introduced into the rotating equipment through rotating seals at a temperature above 750° Fahrenheit.

Reactor 32 is heated by indirect heat exchange with molten salt entering through rotary joints through line 34 above for, example, 850° Fahrenheit and exiting through rotary joints through line 36. The heat source for the salt is not shown.

Those skilled in the art will recognize that there are several methods of obtaining good mixing and agitation in this general type of reactor. The present invention should not be limited to any particular physical design of reactor. The preferred embodiment of the present invention uses a low melting, high temperature stable eutectic salt mixture for indirect heating of the pyrolysis reaction vessel. This is a commercially available mixture. Other commercially available mixtures could also be used.

In larger plants, it may be desirable to use a two-stage reactor, with the first stage being heated by oil and the second stage heated to a relatively higher temperature by molten salt. It is also feasible to use multiple parallel screws in the same reaction vessel to obtain greater capacity.

These alternative examples are given merely as illustration and are not intended to limit the scope of this invention.

A tar scrubber/condenser section 38 is in direct fluid communication with pyrolysis reaction vessel 32, forming a part of the wall of vessel 32. Section 38 includes a tar scrubber 40, a liquid condenser 42 and a condensate drain 44. Tar scrubber 40 is located between reaction vessel 32 and condenser 42. Tar scrubber 40 includes packing suitable for contact between the condensate from condenser 42 and the vapor from reaction vessel 32. Condenser 42 includes a heat exchanger that operates by indirect heat exchange with air or water or other suitable media. Tar drain 44 includes tray 45 located between tar scrubber 40 and condenser 42. Drain line 45' connects to the bottom of tray 45 and passes out through the side of scrubber/condenser 38. Drain line 45' is connected to the inlet side of heat exchanger 46. The outlet side of heat exchanger 46 is connected to condensate product line 48. Heat exchanger 46 operates by indirect heat exchange with chilled water or air or other suitable media.

Functionally, during pyrolysis, hydrocarbon vapors separate from the rubber fragments in reaction vessel 32 and rise into tar scrubber/condenser section 38. The hydrocarbon vapors first rise through tar scrubber 40 which acts to trap solid rubber particles and dust entrained in the vapors.

The hydrocarbon vapor phase then passes through heat exchanger/tar condenser 42 which cools the vapor by indirect heat exchange with water or air or other suitable media. This cooling is sufficient to condense high boiling point liquids such as those with a boiling point above 300° Fahrenheit at atmospheric pressure. The condensed liquids are partially returned as condensate which passes through tar scrubber 40 and carries the rubber particles and dust of the vapor back into the reaction vessel 32. In vessel 32, the condensate mixes with and partially dissolves the tire fragments. A portion of the condensate is drawn off through drain 44 and cooled by indirect heat exchange with water, air or other media in cooler 46 before being removed from the system through line 48 as condensate product.

Experimental work has indicated that a reaction time of 3 to 90 minutes is required to achieve optimum pyrolysis. This optimum reaction time is a function of the feed rate, retention time, temperature of the reactor, the partial pressure of the gas over the pyrolyzing fragments, the rate at which the vapor phase is removed from the pyrolysis reaction vessel, the size of feed chips, and the amount of liquid process condensate present with the solid phase in the reactor.

The preferred embodiment of the present invention utilizes stainless steel construction because of the high temperatures involved in the reaction. Thus it is desirable to keep reaction time to under 15 minutes to save cost and reduce the size of the reactor. After experimentation and study, it has been determined that a retention time in the reactor of between 5 and 10 minutes is optimum. Substantially complete pyrolysis can be achieved during this reaction time by utilizing tire fragments less than 1½ inches in size, such as, for example, less than ½ inch, a reactor temperature of approximately 800°-900° Fahrenheit at a reduced pressure of 6-12 PSIA, and with a portion of the liquid condensate refluxed into the reactor feed so as to add a liquid phase to the solids at the colder end of the reactor. This combination of pyrolysis reactor conditions has proved optimum and practical.

It is possible to obtain practically the same result as is taught by the optimum example given in connection with this preferred embodiment of the present invention by reducing reaction temperature and reducing reaction pressure; or by reducing reaction temperature and increasing resident time; or by reducing reaction temperature and grinding and screening feed chips smaller; or by increasing reaction temperature and pressure; or by increasing residence time and operating at atmospheric or slightly higher pressures. Thus it is clear that the optimum conditions given with this preferred embodiment of the present invention are optimum for a particular commercial application and should not be interpreted to limit the present invention.

The preferred embodiment of the present invention operates at subatmospheric pressure because operation at this pressure optimizes oil yield at the expense of excess fuel gas generation. Subatmospheric pressure also allows this system to produce a higher quality carbon black by pyrolysis at lower temperatures. These lower temperatures make the reaction vessel cheaper to build and maintain. There are, however, practical limits to the partial pressures useable in this type of operation as discussed supra.

Similar results can be obtained by those skilled in the arts by careful choice of reaction conditions. The reactor temperature can be varied from 750° to 1800° Fahrenheit, reaction time can be from 90 to 3 minutes, partial pressure of the gas over the reaction can vary from 1 to 20 PSIA, the feed chip size can vary to any size equal to or below 1½ inches.

It is important to guard against air leaking into the system while it is operated at subatmospheric pressure because air will burn the oil and gas vapors, cause fires, and will burn the surface of the partially pyrolyzed carbonous solid phase. In the preferred embodiment of the present invention, air leakage is guarded against by the use of seals and a blanketing inert purge at a pressure slightly higher than atmospheric gas between the atmospheric and low pressure parts of the system, such as, for example, inert purge just before the rotary air lock on the feed to reactor 32, and efficient rotary air locks at both ends of the reactor/condenser system, and sealed screw conveyors operating within the pyrolysis reactor vessel/condenser system. An inert gas blanket is used for start-up of reactor 32.

During the course of the experimental work that led to reduction to practice of the present invention, it was experimentally determined that overall heat transfer in reactor 32 could be increased from three to five-fold by condensing heavy high boiling point liquids, such as those boiling above 300° Fahrenheit at atmospheric pressure, from the vapor phase effluent of the pyrolysis reaction vessel 32 and refluxing or otherwise permitting flow of a portion of this condensate through such vapor phase effluent into the pyrolysis reaction vessel. This portion of the condensate provides a liquid phase in contact with both the solid tire fragments entering the reactor and the hot reactor wall for at least a portion of the length of the reaction vessel. It also became apparent that this aromatic condensate exerts a dissolving action on the hot rubber fragments. This dissolving action provides further liquid formation and further increases the heat transfer efficiency between rubber fragments in the reactor.

It was also experimentally determined that too much tar build-up would damage the ability of the partially pyrolyzed solid phase to produce high quality carbon black. It was determined that for best results a portion of the condensate should be bled from the pyrolysis reaction vessel to prevent excess tar build up in the reaction vessel. In the preferred embodiment of the present invention, it has been experimentally determined that the continuous reflux ratio should be from 1 to 5 volumes of condensate per volume of condensate product withdrawn from the scrubbed condenser 38 and preferably three.

It is believed that the tar condenser/scrubber 38 and its use is unique to the present invention for at least the following reasons:

(1) The condenser/scrubber 38 is an integral part of the reactor;

(2) The refluxed tar condensate is used as the scrubbing media for the tar scrubber, including washing out dust and tar particles from the vapor stream and reducing the tendency of the scrubber to become plugged. The removal of dust and tar particles from the vapor phase also substantially reduces the tendancy of downstream condensers and separators to plug.

(3) Condensation and reflux of heavy boiling condensate within the pyrolysis reaction vessel allows drain 44 to output a separate product stream of high boiling point hydrocarbon condensate without water.

(4) Scrubber 38 provides a liquid phase to reactor 32 thus increasing overall heat transfer rates within the reactor 32.

A reflux to bleed off ratio of from 1 to 10 can easily be maintained by temperature control of the off vapors from the tar condenser.

The draw or bleed off must be cooled before storage.

VAPOR RECOVERY SYSTEM

The upper end 50 of scrubber/condenser 38 is in fluid communication with oil condenser 52 through line 54. The cold end 56 of oil condenser 52 is in fluid communication with oil separator 58 through line 60. Oil separator 58 is also in fluid communication with line 62 with the low pressure side of vacuum pump 64. The high pressure side 66 of vacuum pump 64 is in fluid communication with separator 68. Fuel gas line 70 is in fluid communication with upper portion 72 of separator 68. The lower section 74 of separator 68 is in fluid communication with the hot side 76 of seal water cooler 78 through line 80. The cold side 82 of seal water cooler 78 is in fluid communication with line 62. The lower portion 84 of oil separator 58 is in fluid communication with oil product line 86.

Functionally, vacuum pump 64 maintains a subatmospheric pressure in reaction vessel 32, tar scrubber/condenser 38, oil condenser 52, oil separator 58 and the lines connecting them with each other and the vacuum pump 64. Vacuum pump 64, in the preferred embodiment of the present invention, is a water sealed pump. The heat of compression is absorbed by the water, which is then separated in separator 68 and recycled through line 80 and seal water cooler 78 into the input side of the pump 64.

In the preferred embodiment of the present invention, vapors are evacuated from the pyrolysis reaction vessel 32 by vacuum pump 64. These vapors are routed through the packed tower tar scrubber 40, the condenser 42 and one or more condensers at various temperature levels, i.e. oil condenser 52 and one or more oil/gas separators, i.e. oil separator 58, between the reactor 32 and the vacuum pump 64. The vapor phase of the pyrolysis reaction is condensed in oil condenser 52. The oil is then separated from residual fuel gas by oil separator 58. The residual fuel gas is drawn through vacuum pump 64 and is separated from its moisture content by separator 68. These separators are conventional knock out drums. The fuel gas then flows out through line 70 and can be used to provide process heat.

The vacuum pump 64 is a combination vacuum pump/gas compressor that can pull a vacuum on vapors between it and the reactor and discharge noncondensed by-product fuel gas from separator 68 at a pressure sufficiently above atmospheric pressure to allow the fuel gas to be burned for the fuel necessary to run the process.

The chemical composition of the by-product fuel gas after maximum oil recovery is shown in Table I below.

TABLE I
TIRE PYROLYSIS FUEL GAS

| | Weight Percent | Mole Percent |
|---|---|---|
| Oxygen | 0.19 | .23 |
| Nitrogen | 3.87 | 5.20 |
| Carbon Monoxide | 5.92 | 7.95 |
| Methane | 8.44 | 19.88 |
| Carbon Dioxide | 5.58 | 4.78 |
| Ethane | 8.09 | 10.17 |
| Ethylene | 8.78 | 11.83 |
| Propane | 4.32 | 3.69 |
| Propylene | 7.90 | 7.08 |
| Isobutane | 1.41 | .90 |
| n-Butane | 1.32 | .87 |
| Butenes | 23.94 | 16.12 |
| Isopentane | 0.91 | .49 |
| n-Pentane | 0.76 | .38 |
| Butadiene | 3.78 | 2.64 |
| Methylbutadiene | 1.73 | .94 |
| 1, 2-Dimethylcyclopropane | 3.04 | 1.62 |
| Pentadiene | 3.77 | 2.07 |
| Hexane | 0.32 | .15 |
| 2-Methyl-1, 3-butadiene | 3.88 | 2.15 |
| Cyclohexane | 0.35 | .15 |
| Heptane | 0.19 | .08 |
| Benzene | 0.97 | .45 |
| Toluene | 0.30 | .11 |
| Xylene | 0.25 | .07 |
| | | 100.00 |
| Hydrogen Sulfide | | 136 ppm by volume |

The by-product oil condensed in oil condenser 52 has a lower boiling point and is lighter than the heavier heavy boiling point condensate fraction condensed by condenser 42. This oil by-product is highly unsaturated and aromatic and has a high vapor pressure and low flash point. If used for fuel oil, a stabilization column is recommended to remove light ends.

It is also possible to add or blend cool heavy condensate from line 48 to the by-product oil. This oil could also be fractionated by multistage condensation after the condenser 42 to produce a plurality of hydrocarbon fractions. An analysis of the combined streams 86, 48 of the pyrolysis oil from rubber tires is given below as Table II and a distillation profile for the oil.

TABLE II
PYROLYSIS OIL FROM RUBBER TIRES

| | | |
|---|---|---|
| Molecular Weight | | 210.0 |
| UOP "K" Factor (calc) | | 10.6 |
| Water by Distillation | | 0.75% |
| Total Sulfur | | 0.774 Wt. % |
| Total Chlorides | | 0.0095 Wt. % |
| Density at 60° F. | | 0.9447 |
| Density at 150° F. | | 0.9384 |
| Viscosity at 60° F. | 12.06 cs | 66.29 SSU |
| Viscosity at 150° F. | 2.79 cs | 35.42 SSU |
| Reid Vapor Pressure | | 1.60 |
| Pour Point | | −15° F. |
| Flash Point (Tag Closed Cup) | | −30° F. |
| Ash Content | | 0.0399 Wt. % |
| Metals (By Emission Spec.) | | Below |
| Heating Value (BTU/lb.) | | 18,938 BTU/lb. |
| True-Boiling-Point Distillation | | Below |

DISTILLATION PROFILE

| Fraction % of Charge | Percent Distilled | Temperature °F. |
|---|---|---|
| 9.99 | 9.99 | 137 |
| 5.03 | 15.02 | 233 |
| 5.09 | 20.11 | 277 |
| 5.03 | 25.14 | 324 |
| 5.09 | 30.23 | 412 |
| 5.09 | 35.32 | 468 |
| 5.09 | 40.41 | 520 |
| 7.18 | 47.59 | 585 |
| 5.55 | 53.14 | 630 |
| 5.09 | 58.23 | 688 |
| 5.35 | 63.58 | 710 |
| 5.09 | 68.67 | 744 |
| 5.09 | 73.76 | 795 |
| 5.09 | 78.85 | 821 |
| 5.03 | 83.88 | 853 |
| 5.35 | 89.23 | 885 |
| 10.77 | 100.00 | Residue |

| Component | Vol % |
|---|---|
| Alkyl Benzenes | 23 |
| Penylnapthalenes | 2 |
| Phenols | 8 |
| 3-Ring Aromatics | 5 |
| Acenaphthylenes | 4 |
| Biphenyls | 5 |
| Alkylnaphthalenes | 9 |
| Indenes | 8 |
| Alkylstyrenes | 8 |
| 4-5-6 Ring Aromatics and Heterocyclic | 20 |

It has also been experimentally found that care must be taken to control the oil condensation temperature in exchanger 52 to prevent the formation of a stable colloidal emulsion of oil and water, the water being the continuous phase and the oil being the dispursed phase.

SOLIDS CLEANING SECTION

The output end 88 of pyrolysis reaction vessel 32 is in fluid communication with the input end 90 of partially pyrolyzed solid phase heat exchanger 92. The partially pyrolyzed carbonaceous material, which comprises the solid phase exiting reaction vessel 32, enters indirect heat exchanger 92, which lowers its temperature from approximately 850° F. to less than 200° F. Heat exchanger 92 is preferably a water jacketed hollow shaft, hollow flight unit. Reducing the temperature of the partially pyrolyzed solid phase lessens the possibility of spontaneous combustion in subsequent milling and storage operations and greatly reduces contamination of the product carbon black.

From the output of exchanger 92, the partially pyrolyzed solid phase carbonaceous material moves through magnetic separator 94. At this point the residual steel wire remaining in the material is essentially free of rubber and can be easily removed with a magnet. Most of the rayon, cotton, polyester and nylon cording and fabric has been destroyed by heat. Residual fiberglass is no longer bonded to the rubber and appears as a fluffy mass with the partially pyrolyzed solid phase carbonaceous material.

After the magnetic separator removes the last trace of steel wire, the solid mass is conveyed (conveyor is not illustrated) to a double deck enclosed vibrating screen 96. The top deck, comprising a large mesh, preferably 4 to 10 mesh screen, scalps most of the matted fiberglass and larger particles of incompletely burned rubber and discharges them to a trash bin via trash stream 98. The second deck comprises a 30 to 60 mesh screen. Material retained on this screen is recycled back to the pyrolysis reaction vessel via recycle line 100. This recycle stream contains some partially pyrolyzed rubber and unremoved fiberglass. In the preferred embodiment of the present invention, the course screen is 10 mesh, and the fine screen is a 40 mesh. The char remnant of the pyrolyzed solid phase carbonaceous material exits double screen 96 by line 102 and proceeds to the char milling and recovery section.

CHAR MILLING AND RECOVERY SECTION

The inlet feed from line 102 to the char milling and recovery section includes an aggregation of very small particles of carbon black cemented together by a skeletal matrix of residues from the decomposition of the tire rubber.

The carbon black results from the carbon black portion of the tire. The carbonaceous material formed in the destructive heat treatment of the rubber and heavy oils in the tires acts as the binder for the individual carbon black particles in the skeletal matrix of the char. The milling process of the present invention consists of breaking down the char agglomerates into individual carbon black particles as well as into much smaller agglomerates of carbon black particles, the agglomerates being less than 40 microns in diameter. Because different grades are used in the tread and walls of the tire and because different tire producers use different quantities of different carbon blacks, the carbon black recovered by the present invention from the original tire composition is a mixture of commercial carbon blacks from many sources in varying proportions. Therefore, carbon black produced by the present invention is a mixture of commercial carbon blacks and new carbon black and has mixed carbon black properties.

The char inlet feed from the double deck screen 96 passes by conveyor 102 to roller mill 104. Roller mill 104 is air swept with a stream of air from compressor 106. The rollers in the roller mill break down the large agglomerates into individual carbon black particles and small agglomerates. These particles are then picked up by the flow of air through the mill 104 and carried to mechanical separator 108. Mechanical separator 108 functions centrifugally to remove larger particles from the air stream. A portion of the heavy rejects from the mechanical separator and the roller mill, which comprise a stream of less than 5% of the total mill feed, leave the process as trash through line 110. Output stream 110 essentially eliminates all residual fiberglass, unburned rubber, iron rust and heavy metallic ash. The remaining carbon black is conveyed by air stream 112 to cyclone separator 114. Eighty to ninety percent of the carbon black is separated here from the air stream and conveyed to pelletizer 120. The remaining carbon black travels with the air stream back through air return 116 to the suction of blower 106 where it is compressed and recycled. Additionally, make-up air is also introduced to the section of the blower 106 through line 117. The major part of the discharge of the blower 106 flows directly to mill 104 to sweep up dust particles. A sidestream is bled off to pass through line 119 and, under pressure, through bag filter 118 where the remaining carbon black is trapped and fed to pelletizer 120. The air from bag filter 118 is vented to atmosphere through line 121 and a blower (not shown).

Those skilled in the art will recognize that carbon black can be produced from char by other types of mills although the quality of the carbon black produced by these alternate methods is not as good as that produced by the present invention. There are competitive means on the market for removing heavy objects, though not as efficiently or with as little loss of carbon black as is possible using the present invention. The prior art teaches the use of impact hammer mills for grinding char. Hammer mills, for example, can be fitted with mechanical separators.

Of course, the finer the char is milled, the better carbon black properties can be obtained. The preferred embodiment of the present invention uses an air swept roller mill with mechanical separators. This does a far superior job of grinding the char to a fine size using much less energy than the prior art.

In the preferred embodiment of the present invention, it has been determined that a roller mill used in combination with mechanical separators and a cyclone and dust bag separator yields a process that can reject larger and heavier particles of unburned rubber, residual ash and iron rust from the system without too much loss of valuable carbon black. This system will also reject a major portion of the residual fiberglass left in the char. The present invention is the first use of roller mills to produce high quality carbon black from the char formed by pyrolysis of used tires. It has been experimentally determined that the preferred embodiment of the present invention, i.e. an air swept roller mill with mechanical separators, can produce 99.9% by weight carbon black product passing a 325 mesh screen (44 micron average particle diameter) and a reject stream of less than 5% of total mill feed that will essentially eliminate residual fiberglass, unburned rubber, iron rust and heavy metallic ash.

It should be noticed that the preferred embodiment of the present invention recovers two products. First, the cyclone separator fines and secondly the bag dust collector fines. These can be mixed together as a common product or kept separate as two grades of carbon black. Since the bag filter finds had been elutriated from the other fines they will consequentially be of smaller average particles size, have lower bulk density and higher specific surface. This will give them different physical properties from the cyclone separator fines.

At this point in the process, the carbon black must be pelletized to form a denser, dust free pellet.

PELLETIZING AND PELLET DRYING SECTION

Carbon black passes from bag filter 118 and cyclone separator 114 to pelletizer 120, which is a commercially available pelletizer. Here the pellets are wetted with water delivered to hot water inlet 122. This water may in part be the water that was heated by indirect heat exchange with other process flows. By "process flows" it is meant the heavy condensate product stream, oil products stream, and partially pyrolyzed solid phase carbonaceous material stream that were cooled with indirect heat exchange with cold water.

Most commercial carbon black is pelletized with water or with suitable binders. While users want denser and more dust free pellets, they still want to retain the dispersion properties of unpelletized blacks. This cannot be done with conventional compactors and pelletizers used with less water or commercial binders.

The preferred embodiment of the present invention uses hot water (140°-180° F. and preferably at 165°-170° F.) without a binder for pelletizing carbon black. Carbon black has tremendous surface area per unit weight and this surface must be completely wetted before stable pellets can be produced. The preferred embodiment of the present invention uses 39.5 pounds of 170° Fahrenheit water per 60.5 pounds carbon black dust to produce a suitable feed for wet pelletizing equipment. This water must then be driven off by heat in pellet dryers before the dry pellet (less than 1% moisture) is bagged and shipped. Extreme care must be taken not to degrade the pellet back to fines on drying. For ready dispersion after drying, it is also necessary that a soft pellet be produced from the pelletizer. Excessive attrition must also be prevented in drying. In addition, the interstitial moisture must be uniformly and slowly removed to prevent disintegration from excessive early steam generation.

The present invention uses commercially available pelletizing equipment. The only thing novel about the pelletizing system is the dryer.

The wet pellets are conveyed by conveyor 124 to dual stage fluid dryer 126. The preferred embodiment of the present invention could utilize commercially available carbon black pellet dryers. Unfortunately, most of these dryers are indirect rotary dryers that burn fuel outside the shell and transfer the heat through the walls to the drying solids inside the rotating shell. This is a very inefficient drying system and is very expensive since stainless steel must be used. Overall heat transfer coefficients are very low because heat must flow through three gas films to heat the pellets. Additionally, stainless steel is expensive and a poor conductor of heat. Because of the very high surface area of carbon black pellets and the affinity of this surface for water, temperatures much higher than the atmospheric boiling point of water must be used to insure that the pellets have discharged moisture down to the minimum residual moisture of less than 1% by weight in the product pellets. As a consequence, these conventional dryers are large, expensive and thermally inefficient.

In the preferred embodiment of the present invention, dryer 126 is a two stage, low temperature fluid bed dryer. It operates as follows. Fuel, any fuel, is burned with excess air to produce 400° to 500° F. hot mixed gases. These hot mixed gases go to first and second stage dryer blowers. The first stage dryer blower draws additional ambient air under temperature control to supply 250° to 350° F. air to the first stage of the fluid bed dryer. The second stage blower takes the hot air directly to the second stage without ambient air dilution.

In the preferred embodiment of the present invention, the hot mixed gases are heated to 400° F. Part of this gas is further cooled to 300° F. in the first stage of fluid bed drying. The second stage of drying receives direct 400° F. air. The two drying beds are in series. The dry pellets exit the second stage fluid bed at 350° F. and 0.45% moisture by weight. The moisture laden flu gases from both drying sections are mixed in duct 134 and enter dust collector at 147° F. with a dew point of 119° F. A further spread of wet and dry temperatures is possible by bypassing part of the heated air from either stage around the dryers and mixing with exit gases ahead of the dust filter. The dust filter is conventional as is rehandling of the collected dust. The collected dust travels through conveyor 138 to the recycle stream 132. The filtered air is discharged through vent 140 to the atmosphere.

The pellets go from the dryer along conveyor 128 to a double deck screen 130. This screen has a top screen that separates oversized pelletizer formations from properly sized pellets and fines. The second screen is sized such that it retains the properly sized carbon black pellets but passes the fines. Both the oversized pellets and the fines are recycled by recycle stream 132 into the roller mill 104.

Properly sized and dried carbon black pellets are conveyed out of the process by output stream 142.

EXAMPLE

The following is given as an example that illustrates, but should not limit, the present invention. 4,187 pounds per hour of mixed passenger and truck tires are sliced in a two-stage slicer 12 to sheets of rubber and carcass reinforcing slabs ranging in size from 2 inches by 4 inches to 3 inches by eight inches. These are fed to a "cracker-mill" for further size reduction to $\frac{1}{2}$ inch or less chips. This mill disintegrates the slabs into chips and substantially denudes the rubber portion of the tires from reinforcing steel wire and breaks a large portion of steel wire down into smaller lengths. There is some oversize material not totally broken down to desired chip size in one pass through this secondary mill. The mill product is conveyed by conventional means to a vibrating screen whereby product larger than $\frac{1}{2}$ inch is recycled to the "cracker-mill" for further reduction to less than $\frac{1}{2}$ inch acceptable material. The fines pass to a magnetic separator where 117 lbs/hr of wire and 42 lbs/hr of unremoved rubber is discarded.

The rubber chips are fed into a hollow shaft, hollow flight screw conveyor pyrolysis reactor 32 with half-pitch flights. The reactor 32 is heated with 950° Fahrenheit circulating molten heat transfer salt pumped through rotating shaft seals that supplies the external indirect heat for pyrolyzing the contents in the reactor 32 for 10 minutes, at a discharge temperature of 850° Fahrenheit, to vapor and solid products. The vapors pass to a tar scrubber/condenser 38 where the outlet vapors from the condenser are cooled to 300° Fahrenheit indirectly with cooling water.

A reflux ratio of 3 pounds of condensed high boiling condensate, having a boiling point above 300° Fahrenheit at atmospheric pressure, per pound of product high boiling point condensate is maintained. The reflux irrigates the packing of the scrubber removing a major portion of the dust entrained from the reactor 32 and returning it to the reactor 32. The net high boiling point condensate drawoff is cooled and added to lower boiling recovered liquids from the next stage (the blending equipment not shown). Uncondensed gases and vapors from the high boiling point condensate condenser pass to the oil condenser where they are cooled to 90° Fahrenheit. Condensed vapors and non-condensable by-product fuel gas pass to a separator 58. Oil from separator 58 passes to oil storage. A total of 2,078 lbs/hr of oil, including high condensate bleed-off, are pumped to storage. 193 lbs/hr fuel gas and 5 lbs/hr uncondensed steam pass from separator 58 to the suction of the vacuum pump 64. A wet vacuum pump 64 is used wherein oily water takes out the heat of compression. Temperature of the vapor stream rises 15° Fahrenheit to 105° Fahrenheit through the vacuum pump 64 which discharges to a separator 68 that separates fuel gas and recycle water. The vacuum pump 64 is designed for a suction pressure of 10 PSIA and a discharge pressure of 24 PSIA. The oily water flows under pressure through an indirect water cooled exchanger and is recycled to the suction side of the vacuum pump 64. The fuel gas saturated with water vapor at 105° Fahrenheit goes to the fuel gas header that supplies combustion gas heat for the circulating molten salt heat transfer fluid with the excess used to heat air for drying carbon black pellets later in the process. An absolute pressure of 11 PSIA is maintained on the reactor vapor space. The molten salt heat transfer fluid exits the reactor at 900° Fahrenheit and returns to the salt heater for reheat.

The solid phase carbonaceous material product from the reactor now comprises char fines, larger char particles, some steel wire, fiberglass and ash. It is cooled and then conveyed to another magnetic separator 94 where an additional 290 pounds per hour of steel wire is removed with traces of char fines coating the wire. The non-magnetic material passes to a double deck vibrating screen 96 containing a 10 mesh and a 40 mesh screen. The oversize from the 10 mesh screen contains 27 lbs/hr fiberglass and 27 lbs/hr of larger char particles. The middle cut from the 40 mesh screen contains 8 lbs/hr of glass fiber and 327 lbs/hr of char. The oversize is discarded, and the middle cut is recycled to the feed end of the reactor 32.

The fines that pass the 40 mesh screen contain 16 lbs/hr fiberglass and 1,842 lbs/hr of char fines. The fines are fed to a roller mill 104 with mechanical air separator and heavy mill reject attachment. The heavy mill reject system rejects 14 lbs/hr fiberglass and 111 lbs/hr heavy char and ash. The carbon black product (99.9 weight %-325 mesh) totals 2,006 lbs/hr of which 2 lbs/hr are unremoved fiberglass.

This material is mixed with 170° Fahrenheit hot softened water on the basis of 0.395 lb hot water to 0.605 lb. carbon black in a carbon black pelletizer 120 of conventional design. The wet pellets are then fed to a two-stage fluid bed dryer 126 with the pellets being dried with 300° Fahrenheit air in the first stage and 400° Fahrenheit air in the second stage. Wet pellets totalling 3,343 lbs/hr are dried to 0.4% moisture by weight (2,073 lbs/hr product).

These pellets contain some oversize and some fines produced from the pelletizing operation and from attrition in the reactor and conveying equipment. This crude dried pellet stream is screened on a double deck vibrating screen 130 with a 10 mesh and a 80 mesh screen. The minus 10/plus 80 mesh center cut from the screen (totalling 1,724 lbs/hr of product pellets) is conveyed to product pellet bagging (not shown). The oversize, fines and fines from the dryer bag house totalling 289 lbs/hr are recycled back to the roller mill 104 feed by a conventional conveyor system.

Table III shows comparitive chemical properties of "Pyroblack 7007", the carbon black produced by the present invention and two other standard commercial carbon blacks readily available on the market that it closely resembles.

TABLE III

COMPARATIVE CHEMICAL PROPERTIES NEW PYROBLACK 7007 AND TYPICAL COMMERCIAL CARBON BLACKS

| PROPERTY | METHOD | N-990 MT | Pyroblack 7007 | N-774 SRF |
|---|---|---|---|---|
| DBP Absorption cc/100g | ASTM D2414 (mod.) | 31 | 76 | 75 |
| Iodine Number | ASTM D1510 | 9 | 62 | 30 |
| C-Tab Number | Phillips | 14 | 56 | 36 |
| % Ash | ASTM D1506 | 0.20 | 13.36* | 0.51 |
| % Heating Loss | ASTM D1509 | 0.01 | 0.40 | 0.45 |
| Toluene Discoloration, % | ASTM D1618 | 12.8 | 90.2 | 94.0 |
| pH | ASTM D1512 | 7.99 | 7.12 | 8.75 |
| % Sulfur | ASTM D1619 (B) | 0.00 | 2.04 | 0.64 |

*Primarily Zinc Oxide, Sulfur, SiO$_2$

Table IV compares Pyroblack 7007, the carbon black product produced by the present invention, with other commercial carbon blacks and filler when vulcanized with rubber.

TABLE IV

TEST RESULTS
Comparing SRF N774, Fillers and New Pyroblack 7007

| | MIN | Carbon Black SRF N774 (A) | New Pyroblack 7007 | MT Carbon Black Sevacarb MT, Selvalco | Finely Ground Antracite Powder |
|---|---|---|---|---|---|
| SBR 1502, gm | | 100.00 | 100.00 | 100.00 | 100.00 |
| Zincoxide, gm | | 3.00 | 3.00 | 3.00 | 3.00 |
| Styric Acid, gm | | 1.00 | 1.00 | 1.00 | 1.00 |
| SRF carbon black N774, gm | | 50.00 | — | — | — |
| Pyroblack 7007, Process, gm | | — | 50.00 | — | — |
| Sevacarb MT, gm | | — | — | 50.00 | — |
| Antracite Powder, gm | | — | — | — | 50.00 |
| Santocure MOR, gm | | 1.00 | 1.00 | 1.00 | 1.00 |
| Sulfur, gm | | 1.75 | 1.75 | 1.75 | 1.75 |
| Mooney 125 minvardr Mcnh | | 40 | 52 | 32.5 | 36.5 |
| +5 min | | 43 | 44.2 | 745 | 745 |
| Rheometerprov mink-cnh | | 12.8 | 16.3 | 11.7 | 11.2 |
| 190   +2 min | | 1.65 | 1.65 | 2.13 | 2.15 |
| mix R-cnh | | 77.3 | 77.2 | 24.2 | 70.0 |
| tc90 min | | 4.25 | 4.15 | 5.3 | 5.9 |
| "Shore" Hardness | 25 | 61 | 65 | 50 | 51 |
| "Shore" Hardness | 50 | 65 | 68 | 59 | 59 |
| "Shore" Hardness | 75 | 65 | 69 | 60 | 61 |
| "Shore" Hardness TRH | 25 | 58 | 65 | 35 | 36 |
| "Shore" Hardness TRH | 50 | 66 | 73 | 60 | 58 |
| "Shore" Hardness TRH | 75 | 68 | 73 | 62 | 62 |
| Tensile Strength MPA | 25 | 16.9 | 6.6 | 0.2 | 0.1 |
| Tensile Strength MPA | 50 | 18.5 | 8.0 | 9.2 | 3.4 |
| Tensile Strength MPA | 75 | 15.2 | 7.9 | 7.6 | 4.1 |
| Tensile % Elongation | 25 | 690 | 580 | 1300 | 920 |
| Tensile & Elongation | 50 | 480 | 430 | 600 | 720 |
| Tensile & Elongation | 75 | 400 | 400 | 400 | 700 |
| Abrasive Strength | 25 | 187 | 102 | 0 | 0 |
| Abrasive Strength | 50 | 100 | 79 | 43 | 26 |
| Abrasive Strength | 75 | 96 | 89 | 40 | 23 |
| Elongation at 2.5 mp % | 50 | 190 | 118 | 207 | 500 |
| — | 50 | 9.0 | 7.3 | 5.0 | 51.7 |

TABLE IV-continued
TEST RESULTS
Comparing SRF N774, Fillers and New Pyroblack 7007

|  | MIN | Carbon Black SRF N774 (A) | New Pyroblack 7007 | MT Carbon Black Sevacarb MT, Selvalco | Finely Ground Antracite Powder |
|---|---|---|---|---|---|
| Module 200% mpz | 25 | 5.5 | 2.2 | 0.2 | 0.1 |
| Module 200% mpz | 50 | 5.5 | 3.7 | 2.4 | 1.5 |
| Module 200% mpz | 50 | 5.5 | 3.7 | 2.4 | 1.5 |
| Shrinkage 24 hours | 50 | 19.6 | 25.6 | 31.3 | 49.3 |
| Density Mglm | 50 | 1.15 | 1.15 | 1.14 | 1.10 |
| Fixed Carbon Wt % |  | — | 89 | — | — |
| Ash Wt % |  | 11 | 11 | — | — |

The scope of the present invention should only be limited by the appended claims.

We claim:

1. A process for manufacturing carbon black and hydrocarbons from discarded tires, comprising;
   disintegrating the tires to reduce the tires to fragments;
   pyrolyzing the fragments in a pyrolysis reaction vessel at a temperature and pressure and for a reaction time sufficient to cause the fragments to dissociate into a vapor phase and a solid phase;
   condensing a high boiling point condensate containing reactor effluent particulate from a portion of the vapor phase at a process stream;
   feeding at least a first portion of such high boiling point condensate process stream containing effluent particulate from the reactor obtained by said condensing of a portion of the vapor phase back into the pyrolyzing solid phase;
   fractionating a second portion of the vapor phase to produce hydrocarbon fractions;
   said pyrolyzing step including indirectly, internally heating the fragments in the reactor with molten salt and, producing carbon black from the solid phase.

2. A process as in claim 1 wherein the step of producing carbon black includes:
   separating trash from the partially pyrolyzed solid phase after said reaction time,
   separating unpyrolyzed material from the partially pyrolyzed solid phase;
   recycling the unpyrolyzed material to the pyrolysis reaction vessel;
   milling the pyrolyzed solid phase to carbon black.

3. A process as in claim 2 including:
   cooling the partially pyrolyzed solid phase after it leaves the pyrolysis reaction vessel.

4. A process as in claim 3 including:
   wetting at least a portion of the carbon black;
   forming the wetted carbon black into pellets; and
   drying the carbon black pellets.

5. A process as in claim 4 wherein the carbon black pellets are dried in a multi-bed fluid bed dryer having at least two stages in series.

6. A process as in claim 5 wherein said multi-stage drying comprises
   producing a heated air stream;
   cooling a first portion of said air stream and passing it in contact with said carbon black pellets in the first stage of a multi-stage fluid dryer; and
   passing a second portion of said air stream at a relatively higher temperature into contact with said carbon black pellets in the second stage of the multi-stage fluid dryer.

7. A process as in claim 6 including passing the effluent air flow from at least one stage of the multi-stage fluid bed dryer through a dust collector.

8. A process as in claim 7 including mixing a portion of the heated air stream with the effluent air flow prior to passing the effluent air flow through said dust collector.

9. A process as in claim 4 wherein at least a portion of the water heated in indirect heat exchange with condensing hydrocarbon fractions from the vapor phase is subsequently used to wet the carbon black.

10. A process as in claim 3 wherein the cooling is accomplished by passing said solid phase in indirect heat exchange with water.

11. A process as in claim 10 wherein at least a portion of the water heated by indirect heat exchange with the solid phase is subsequently used to wet the carbon black.

12. A process as in claim 1 wherein the heat is introduced through an internal, hollow shaft of the reactor having protrusions therefrom and the molten salt mixture is introduced into the rotating shaft through a rotating seal.

13. A process as in claim 12 wherein the molten salt mixture is introduced cocurrently with the fragments.

14. A process as in claim 1 including passing the vapor phase through a scrubber before it is condensed.

15. A process as in claim 14 including passing the reflux condensate through said scrubber before the condensate is returned to the pyrolyzing solid phase.

16. A process as in claim 15 wherein pyrolyzing of the solid phase, scrubbing of said vapor phase, and said refluxing all occur in at least one pyrolysis reaction vessel at subatmospheric pressure.

17. A process as in claim 16 wherein said second portion of said vapor is cooled to condense out oil and said oil is separated from the gas containing remainder of said vapor phase.

18. A process as in claim 17 wherein said oil is cooled out of said vapor phase by passing said vapor phase in indirect heat exchange.

19. A process as in claim 18 including:
   compressing the gas containing remainder of said vapor phase to provide fuel gas for the pyrolysis reactor.

20. A process as in claim 19 wherein said compression is accomplished by the same mechanical means used to maintain subatmospheric pressure in the pyrolysis reaction vessel.

21. A process as in claim 1 wherein the first portion of the vapor phase is partially condensed to provide reflux condensate by indirect heat exchange with water.

22. A process as in claim 21 wherein at least a portion of the reflux condensate obtained from the first portion of said vapor phase is removed from said pyrolysis reaction vessel before the reflux condensate is returned to the pyrolyzing solid phase.

23. A process as in claim 1 wherein the first portion of the vapor phase is partially condensed to provide reflux condensate by indirect air cooling.

24. A process as in claim 1 wherein the pyrolyzing occurs in an oxygen limited hydrocarbon vapor atmosphere isolated from ambient air by the use of an inert purge gas seal and airlocks at the entry port of the reaction vessel.

25. A process for manufacturing carbon black from discarded tires, comprising:
    disintegrating the tires to reduce the tires to fragments;
    pyrolyzing the fragments in a pyrolysis reaction vessel at a temperature and pressure and for a reaction time sufficient to cause the fragments to dissociate into a vapor phase and a solid phase;
    condensing a high boiling point condensate containing reactor effluent particulate from a portion of the vapor phase as a process stream;
    feeding at least a first portion of such high boiling point condensate process stream containing effluent particulate from the reactor obtained by said condensing of a portion of the vapor phase back into the pyrolyzing solid phase;
    fractionating a second portion of the vapor phase to produce hydrocarbon fractions;
    milling the pyrolyzed solid phase after it leaves the pyrolysis reaction vessel; wherein said step of milling includes—
    sweeping an air swept rolling mill with a flow of air to produce an effluent air stream containing carbon black particles and trash;
    passing the effluent air stream from the rolling mill through a mechanical separator to produce a waste stream of trash particles and product air stream containing carbon black particles;
    passing said product air stream through a cyclone separator to remove 80–90% of the relatively large carbon black particles and to produce a fine product air stream containing relatively finer carbon black particles.

26. A process for manufacturing carbon black from discarded tires, comprising:
    disintegrating the tires to reduce the tires to fragments;
    pyrolyzing the fragments in a pyrolysis reaction vessel at a temperature and pressure and for a reaction time sufficient to cause the fragments to dissociate into a vapor phase and a solid phase;
    milling the pyrolyzed solid phase after it leaves the pyrolysis reaction vessel, wherein said step of milling includes—
    sweeping an air swept rolling mill with a flow of air to produce an effluent air stream containing carbon black particles and trash;
    passing the effluent air stream from the rolling mill through a mechanical separator to produce a waste stream of trash particles and product air stream containing carbon black particles;
    passing said product air stream through a cyclone separator to remove 80–90% of the relatively large carbon black particles and to produce a fine product air stream containing relatively finer carbon black particles.

27. A process as in claim 26 including recycling the waste stream of trash particles.

28. A process as in claim 26 including:
    filtering at least a first portion of said fine produce air stream to remove airborn carbon black.

29. A process as in claim 26 including compressing at least a portion of said fine product air stream and returning it to the air swept rolling mill.

30. A process for manufacturing carbon black and hydrocarbons from discarded tires, comprising:
    disintegrating the tires into fragments less than 1½ inches by 1½ inches;
    pyrolyzing the fragments in a pyrolysis reaction vessel at between 750° and 1800° Fahrenheit oxygen limited hydrocarbon vapor atmosphere at between 1–20 PSIA for between 90 and 3 minutes to produce a solid phase and a vapor phase;
    producing a separate high boiling point condensate process stream from a portion of said vapor phase in said reaction vessel;
    refluxing a portion of said condensate back into said fragments;
    fractionating a second portion of said vapor phase to produce oil and gas;
    milling the pyrolyzed solid phase after it leaves the pyrolysis reaction vessel, wherein said step of milling includes—
    sweeping an air swept rolling mill with a flow of air to produce an effluent air stream containing carbon black particles and trash;
    passing the effluent air stream from the rolling mill through a mechanical separator to produce a waste stream of trash particles and product air stream containing carbon black particles;
    passing said product air stream through a cyclone separator to remove 80–90% of the relatively large carbon black particles and to produce a fine product air stream containing relatively finer carbon black particles.

* * * * *

UNITED STATES PATENT AND TRADEMARK OFFICE
CERTIFICATE OF CORRECTION

PATENT NO. : 4,250,158  
DATED : February 10, 1981  
INVENTOR(S) : Age Solbakken, Fred P. Apffel, Sam P. Robinson, Bobby L. Hayes It is certified that error appears in the above—identified patent and that said Letters Patent is hereby corrected as shown below:

In the Abstract, line 4, change "pyrolized" to --pyrolyzed--.

Column 1, line 35, change "pyrolized" to --pyrolyzed--.

Column 2, line 13, change "condensors" to --condensers--.

Column 3, line 3, change "pyrolizing" to --pyrolyzing--.

Column 3, line 52 change "pyrolized" to --pyrolyzed--.

Column 7, line 68, change "tendancy" to --tendency--.

UNITED STATES PATENT AND TRADEMARK OFFICE
CERTIFICATE OF CORRECTION

PATENT NO. : 4,250,158                Page 2 of 2

DATED : February 10, 1981

INVENTOR(S) : Age Solbakken, Fred P. Apffel, Sam P. Robinson, Bobby L. Hayes

It is certified that error appears in the above—identified patent and that said Letters Patent is hereby corrected as shown below:

Column 8, line 2, change "tendancy" to --tendency--.

Column 12, line 31, change "finds" to --fines--.

Column 14, line 56, change "recycle" to -- recycled--.

Column 18, line 44, change "cocurrently" to --concurrently--.

Column 20, line 21, change "produce" to --product--.

Signed and Sealed this

Twenty-sixth Day of January 1982

[SEAL]

Attest:

*Attesting Officer*

GERALD J. MOSSINGHOFF

*Commissioner of Patents and Trademarks*